United States Patent [19]

Hughes et al.

[11] 4,087,846
[45] May 2, 1978

[54] PROTECTIVE CIRCUIT APPARATUS

[76] Inventors: W. Taliaferro Hughes, 1519 Country Club Rd., Wilmington, N.C. 28401; Stewart P. Barrett, Jr., 3417 Walton Way Ext., Augusta, Ga. 30317

[21] Appl. No.: 735,938

[22] Filed: Oct. 27, 1976

[51] Int. Cl.² .................................................. H02H 3/10
[52] U.S. Cl. ............................................ 361/42; 361/98
[58] Field of Search ........................... 361/42, 44–50, 361/93, 98, 100

[56] References Cited

U.S. PATENT DOCUMENTS

| | | | |
|---|---|---|---|
| 2,999,189 | 9/1961 | Gerrard | 361/50 |
| 3,356,939 | 12/1967 | Stevenson | 361/44 X |
| 3,373,341 | 3/1968 | Wattson | 361/100 X |
| 3,665,252 | 5/1972 | Rogers, Sr. et al. | 361/50 |
| 3,728,581 | 4/1973 | Adamo | 361/50 |
| 3,769,549 | 10/1973 | Bangert, Jr. | 361/46 |
| 3,771,020 | 11/1973 | Smith | 361/48 |

Primary Examiner—Harry E. Moose, Jr.
Attorney, Agent, or Firm—Michael F. Petock

[57] ABSTRACT

A protective circuit apparatus is disclosed for disconnecting power flow to an electrical device upon the sensing of a predetermined condition such as current flow above a predetermined level in the ground line or current flow in excess of a predetermined level in the power or hot line. In a preferred embodiment, the circuit for detecting excess current flow in the ground wire and the circuit for detecting excess current flow in the hot line are connected in series with a two to three wire converter circuit which insures proper connection to a source of electrical energy.

6 Claims, 4 Drawing Figures

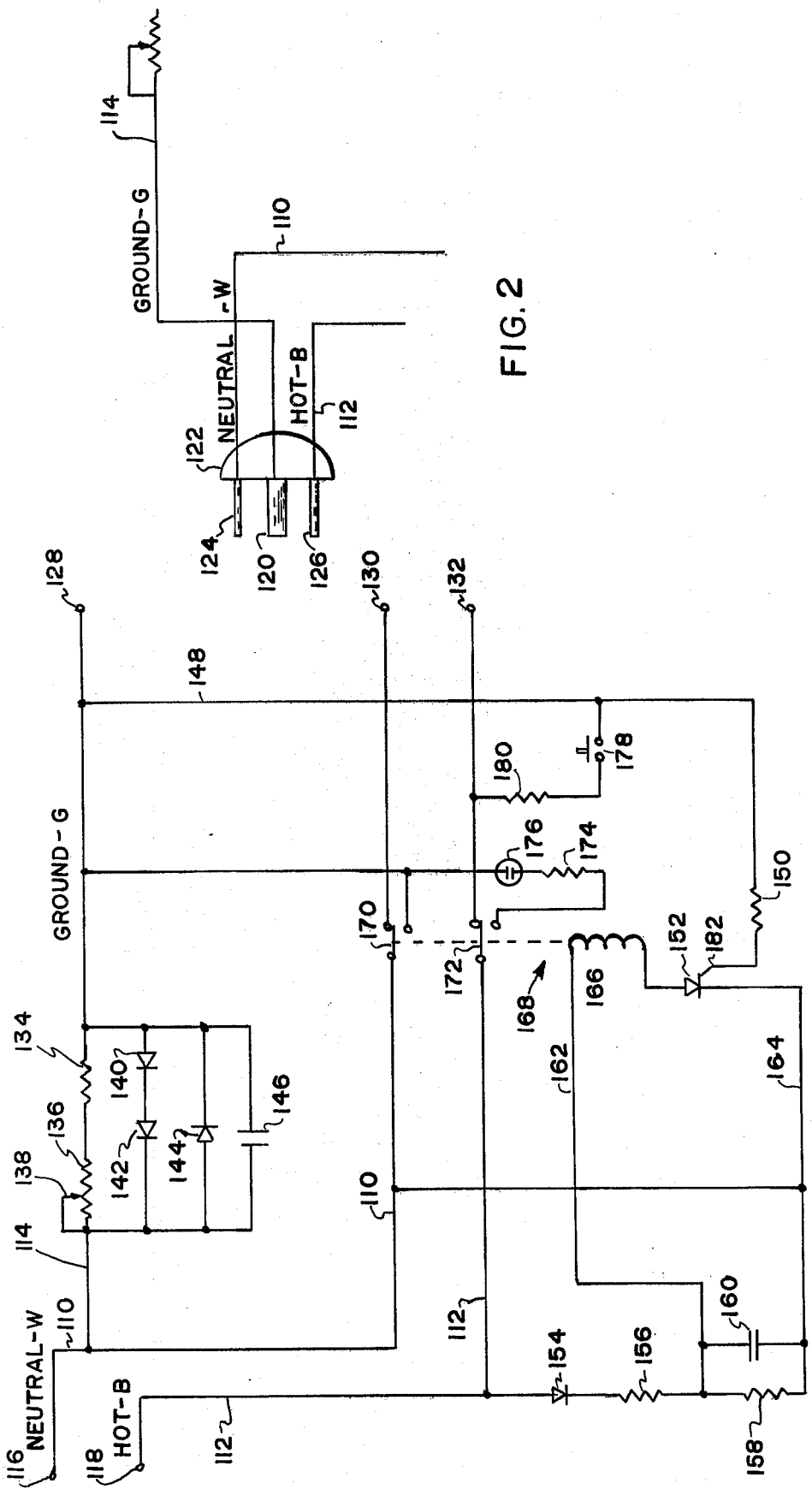

PROTECTIVE CIRCUIT APPARATUS

CROSS-REFERENCE TO RELATED APPLICATION

The subject matter of this application relates to the co-pending application of the inventors herein which is entitled "Two to Three Wire Converter Circuit" which was filed on Aug. 5, 1975 and bears Ser. No. 602,173 and is now U.S. Pat. No. 4,025,822. The disclosure of this patent is hereby incorporated by reference.

BACKGROUND OF THE INVENTION

The present invention relates to a protective circuit apparatus. More particularly, the present invention relates to a protective circuit apparatus in which power is disconnected from an electrical device in response to the detection of current flow in excess of a predetermined level in the ground line or the detection of current flow in excess of a predetermined level in the hot line. The present invention is also particularly directed to a combination of three protective circuits in the form of a two to three wire converter circuit, a ground fault detector and interrupter circuit and an overload trip-out circuit, which may be advantageously used in combination to provide maximum protection for a user of an electrical device.

There are many industrial and domestic applications in which it is desired to provide a protective circuit which protects against certain circuit faults or abnormalities. Such abnormalities include current overloads, excessive torque demands, short circuits and current leakages to ground. It is also desirable to employ a combination of protective circuit devices which provide protection against all of these possible abnormalities.

In recent years, the accepted way of protecting against these faults is to provide the electrical device being used with a ground connection. The electrical devices protected in this way include all types of stationary electrical equipment and devices, such as major appliances, and portable electrical devices, such as electric drills, saws and other power hand tools and portable appliances. The ground wire is connected to the housing of the electrical device and it is assumed that the housing of the electrical device will not rise above ground potential. However, this assumes that there is a perfect connection of the electrical housing to ground potential. This is not always a valid assumption, as a fault, such as an open circuit condition or a high resistance condition, may occur at numerous points between the electrical device and the point of a true ground connection, such as at connections in receptacle boxes, connections made at connection points in the wiring between the main distribution box and the electrical outlet, connections in distribution box and connections to a water line or other ground connection plane.

There is a need for a circuit that will detect current flow in the ground connection above a predetermined level. Preferably, the predetermined level of ground current which will energize a disconnect circuit is relatively low. There is also a need for a protective circuit in the form of an overload trip-out circuit which will disconnect power flow to an electrical device when the current flow in the power or hot lead exceeds a predetermined level. Preferably, the predetermined level of current flow through the high or hot lead at which point the power flow to the electrical device is disconnected is selectably adjustable and relatively larger than in the case of a ground fault detector. For example, in electrical devices, such as hand tools, it may be very desirable to have the power disconnected to an electrical device, such as an electric drill, if the torque demand suddenly becomes excessive. For example, in the use of an electric drill, utilizing a wood boring bit, it is desirable that the power to the drill be disconnected if the wood bit hits a nail or other very hard object which might result in the user of the electrical device receiving a broken wrist or other injury.

There is also a need for a protective circuit system which would enable the use of the ground line current detector and interrupter circuit and the overload trip-out circuit in situations where only two socket receptacles are available, one for the high line and one for the neutral line. This is in contrast to the now normally accepted practice of installing three socket receptacles having a high line connection, neutral line connection and a ground line connection. The overall protective system would utilize a two to three wire converter circuit as disclosed in our co-pending application entitled "Two to Three Wire Converter Circuit" referred to above, as the input to the ground fault detector and interrupter circuit and overload trip-out circuit disclosed and claimed herein.

SUMMARY OF THE INVENTION

The present invention provides protective circuit apparatus for detecting current flow in excess of a predetermined value or level and means for disconnecting power flow to the electrical device when such current flow in the ground line is detected. The present invention also provides a circuit for detecting current flow through the power lines to an electrical device and for disconnecting power to electrical device when the current flow exceeds a predetermined value. The first protective circuit detects the fault condition of a short to the housing of the electrical device causing current flow in the ground line. The second protective circuit provides a protective circuit for detecting an overload condition or a condition in which the torque or power output of an electrical device exceeds a selected predetermined value. The present invention also contemplates the use of these two circuits with a two to three wire converter circuit for enabling the connection to receptacle outlets in which only a high and neutral line are connected, but which does not have a separate and independent ground line connection.

Briefly, in accordance with the present invention a protective circuit apparatus is provided for detecting current flow through a ground line from the housing of an electrical device supplied with electrical power through a three line system including a high line, a neutral line and a housing ground line. Sensing means are provided for sensing current flow in excess of a predetermined value through a housing ground line. Means are provided responsive to the sensing means for disconnecting power to the electrical device when current flow in excess of the predetermined value is sensed.

An overload trip-out protective circuit is provided for automatically disconnecting power to an electrical device upon detection of the current drawn by the device exceeding a selected predetermined value. The overload trip-out circuit includes means for sensing the current through at least one of the power line connections to the electrical device. Means are provided for switchably disconnecting power from the electrical device in response to a signal from the current sensing means. The overload trip-out protective circuit includes means for adjustably selecting the value of the sensed current which will cause the switch means to disconnect the power from the electrical device.

The present invention also contemplates a protective system for use with electrical devices provided with a normally high or power terminal, a normally neutral terminal and a ground terminal in which protection is provided for users of the electrical device. An overload trip-out circuit adapted to be connected to the electrical device for sensing current in excess of a selectable predetermined value is provided which includes means for disconnecting power to the electrical device when the sensed current exceeds the selected predetermined value. The protective system also includes a ground fault detection circuit connected to the overload trip-out circuit for sensing current flow through a ground line connected to the ground terminal of the electrical device and includes means for disconnecting power to the electrical device in response thereto. The protective system further includes a two to three wire converter circuit adapted to be connected to an electrical supply having at least a high and a neutral connection. The two to three wire converter circuit has its output connected in series with the ground fault detection circuit and the overload trip-out circuit. The two to three wire converter circuit enables power flow only if a normally neutral line is connected to the neutral line of the supply and a normally high line is connected to the high line of the supply.

BRIEF DESCRIPTION OF THE DRAWINGS

For the purposes of illustrating the invention, there are shown in the drawings forms which are presently preferred; it being understood, however, that this invention is not limited to the precise arrangements and instrumentalities shown.

FIG. 1 is a schematic diagram of a ground fault detector and interrupter circuit in accordance with the present invention.

FIG. 2 is a schematic diagram of a modified embodiment of the circuit shown in FIG. 1.

DETAILED DESCRIPTION OF THE PREFERRED EMBODIMENTS

Figures 3, 4:
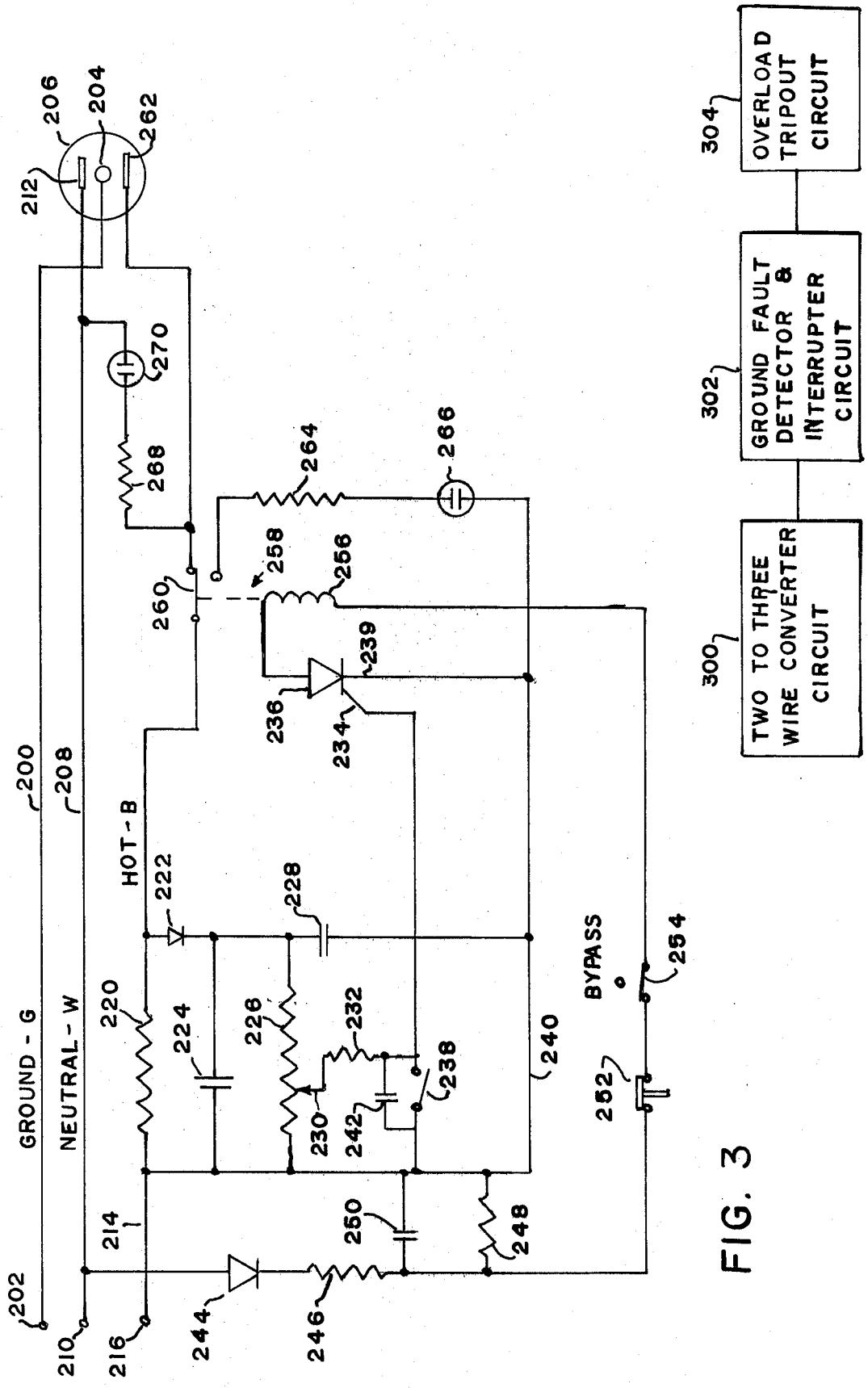
FIG. 3 is a schematic diagram of an overload trip-out circuit in accordance with the present invention.
FIG. 4 is a block diagram of an overall protective system in accordance with the present invention.

Referring now to the drawings in detail wherein like numerals indicate like elements, there is shown in FIG. 1 a ground fault detector and interrupter circuit having a neutral line 110 and a hot line or high line 112. The neutral line in most wiring applications is provided with a white insulation and a W is provided to indicate this in the drawings. The hot line or high line is in most conventional wiring applications provided with wire having a black colored insulation and is designated with a B. However, it is understood that except for the convention used in the electrician trade, this color designation has absolutely no significance. Ground wire 114 is designated with a G as the ground wire is conventionally provided with a green colored insulation covering. Terminal 116 of neutral line 110 and terminal 118 of hot line or high line 112 are connected to a source of electrical power. It is essential that the normally neutral terminal 116 be connected to the neutral line of the supply and that terminal 118 be connected to the high line of the supply. The proper connection may be assured by the use of a two to three wire converter circuit as disclosed in the previously referred to co-pending application of the inventors herein or other suitable circuitry or connection means known in the art.

Referring to FIGS. 1 and 2 of this application and FIG. 1 of the previously referred to co-pending application on the two to three wire converter circuit, FIG. 1 of this application may be modified as shown in FIG. 2 by connecting ground wire 114 directly to a ground prong 120 of plug 122, instead of to neutral line 110. The neutral line 110 may be connected to a prong 124 and the hot line 112 connected to a prong 126. The plug 122 may then be connected into receptacle 64 as shown in the drawings of the co-pending application on the two to three wire converter circuit, with prong 124 mating with neutral socket 68 and prong 120 mating with socket 70. In the alternative, it is understood that terminals 116 and 118 of FIG. 1 of this application may be connected directly to lines 76 and 74, respectively, of FIG. 1 of the two to three wire converter circuit application referred to above.

Output terminals 128, 130, 132 shown in FIG. 1 may be connected to an electrical device to be protected or they may be connected to the overload trip-out circuit shown in FIG. 3. In either event, fault conditions of the electrical device applying an electrical potential to the housing of the electrical device will cause current flow through terminal 128 and ground line 114 to ground. This current flow will pass through resistor 134 and rheostat 136. Rheostat 136 is a variable resistance, made variable by reason of arm 138 shorting out a portion of the resistance. Diodes 140 and 142 are connected across resistor 134 and rheostat 136 in the polarity as shown. Diode 144 is connected in the opposite polarity across resistor 134 and rheostat 136 along with capacitor 146. Diodes 140, 142 and 144 develop a potential of approximately 0.5 volts across their terminals when they conduct in the forward direction. Therefore, a positive potential of approximately 1 volt maximum may be developed across resistor 134 and 136 on the ground line and applied via line 148 and resistor 150 to the gate input 182 of thyristor or silicon controlled rectifier 152. Diode 144 conducts any negative going signals thus preventing shock to the operator during the negative half cycle of the applied voltage cycle. The negative alternation of the applied voltage cycle is of the incorrect polarity for gating of thyristor 152. The sensitivity of the circuit is adjustable by means of varying the setting of arm 138 of rheostat 136. In a particular embodiment with resistor 134 being 150 ohms and rheostat 136 being variable up to 1,000 ohms, diodes 140, 142 and 144 being those commercially available from International Rectifier and identified as type 70H40A and thyristor 152 being a silicon controlled rectifier manufactured by General Electric Company and identified as GEMR-5, Suffix F113, the sensitivity of the triggering of thyristor 152 may be varied from 0.6 milliamperes to 3.6 milliamperes in ground line 114. Of course, larger current flow will cause the triggering of the thyristor. The sensitivity indicated is the degree to which the circuit may be adjusted to allow small and harmless amounts of current flow through ground line 114 without triggering thyristor 152.

The cathode-anode circuit of thyristor 152 is supplied with a direct current source of power from a power supply comprised of diode 154, resistors 156 and 158 and capacitor 160. This half wave power supply is conventional in nature and need not be described here in detail. The power from the d-c power supply is applied to the cathode-anode circuit of thyristor 152 through lines 162 and 164 and the coil 166 of relay 168. Relay 168 is provided with contacts 170 in neutral line 110 and contacts 172 in hot line or high line 112. Contacts 170 and 172 normally maintain the neutral line 110 and the hot line 112, respectively, in a closed circuit condition, that is, allowing current flow. Upon triggering of thyristor 152 by reason of the development of a sufficient voltage across resistor 134 and rheostat 136, thyristor 152 conducts causing current flow through coil 166 and the opening of contacts 170 and 172. The opening of contacts 170 and 172 connects resistor 174 and neon tube 176 across lines 112 and 110 thereby energizing neon tube 176 which indicates that a fault condition has occurred.

Push button switch 178 and resistor 180 are connected between line 112 and the trigger electrode 182 of thyristor 152 via resistor 150. The momentary closing of push button switch 178 applies a small a-c potential to the gate of thyristor 152 thereby causing the triggering of thyristor 152 for test purposes.

Referring now to FIG. 3, there is shown an overload trip-out circuit having a ground line 200 having a terminal 202 which may be connected to terminal 128 of the circuit of FIG. 1. In the alternative, terminal 202 may be connected to any suitable ground line. When the circuit of FIG. 3 is used in conjunction with the circuit of FIG. 1, ground line 200 serves as an extension of ground line 114. Ground line 200 is connected to the ground socket 204 of a special receptacle 206.

The overload trip-out circuit shown in FIG. 3 is provided with a neutral line 208 provided with an input terminal 210 and an output terminal 212 in receptacle 206. The high or hot line 214 is provided with an input terminal 216. Terminals 210 and 216 may be connected to terminals 130 and 132, respectively, of the ground fault detector and interrupter circuit shown in FIG. 1, or in the alternative, may be connected to another suitable source of electrical power. Means is provided for sensing current flow in at least one of the power lines, either hot line 214 or neutral line 208. As shown in FIG. 3, hot line or high line 214 is provided with a resistor 220 connected in series therewith for sensing current flow through line 214. The voltage across resistor 220 is rectified by diode 222 and filtered by capacitors 224 and 228. The voltage across capacitor 224 is applied to potentiometer 226. Resistor 220 may be a resistor of small value, such as for example, a wire wound resistor having a resistance of 0.67 ohms. Wiper arm 230 of potentiometer 226 picks off or selects a portion of the voltage across resistance 226. This voltage is applied through resistor 232 to the gate 234 of thyristor 236 when bypass switch 238 is open. When bypass switch 238 is closed, the thyristor gate 234 is tied to the cathode 239 of thyristor 236 via line 240. Capacitor 242 bypasses any switching spikes.

The cathode-anode circuit of thyristor 236 is supplied with a source of direct current potential from a conventional half wave power supply comprised of diode 244, resistors 246 and 248 and capacitor 250 via reset switch 252, bypass switch 254 and coil 256 of relay 258. Relay 258 is provided with contacts 260 in the hot or high line 214 providing a continuous connection to socket 262 of receptacle 206. The energization of thyristor 236 by reason of a predetermined voltage developed across resistor 220, as selected by the wiper arm 230 of potentiometer 226, causes the opening of relay contact 260 causing the a-c potential to be applied across resistor 264 and neon tube 266 thereby indicating an overload condition. When relay 258 is not energized, the a-c voltage is connected across resistor 268 and neon tube 270 between hot line 214 and neutral line 208. The energization of neon tube 270 indicates that the voltage is properly connected and applied across sockets 212 and 262. Neon tube 270 may be provided with a green cover glass. The opening of switch 254 allows the circuit to be bypassed, as relay 258 cannot be energized. Reset switch 252 allows the resetting of the circuit once the circuit has been energized as it momentarily interrupts the current flow through thyristor 236 causing thyristor 236 to be returned to its non-conductive state.

By varying the position of wiper arm 230 of potentiometer 226, the sensitivity or amount of current flow through hot line 214 which will cause the triggering of thyristor 236 may be selected. Therefore, a predetermined degree of loading or overloading may be selected by means of wiper arm 236 of the potentiometer 226 thereby selecting the trigger point of thyristor 236. Therefore, the protective circuit may be adjusted to adapt to the particular circumstances. For example, the amount of current drawn by a drill may be different from the amount of current drawn by an electric saw. Also, even with respect to the use of any particular device, the amount of current required for a particular operation will vary with various conditions. For example, an electric drill may draw a larger current under normal conditions in drilling through hard wood than it would in drilling through soft wood. However, the circuit would still provide protection if a nail were hit in either soft or hard wood in order to disconnect power from the drill when an extremely hard object is hit.

Referring now to FIG. 4, there is shown an embodiment of the invention in which the two to three wire converter circuit 300 is shown as providing the input to a ground fault detector and interrupter circuit 302. The two to three wire converter circuit may be one as disclosed in our co-pending application Ser. No. 602,173 referred to previously. The ground fault detector and interrupter circuit 302 is shown as providing the input to the overload trip-out circuit 304. However, it is understood that the positions of the ground fault detector and interrupter circuit 302 and the overload trip-out circuit 304 may be interchanged. The two to three wire converter circuit 300 may be connected to any conventional two or three wire alternating current supply as discussed in the co-pending application of the inventors herein which was referred to previously. The overload trip-out circuit 304 supplies electrical energy to an electrical device that is to be utilized with the person utilizing it being protected.

The present invention may be embodied in other specific forms without departing from the spirit or essential attributes thereof, and, accordingly, reference should be made to the appended claims, rather than to the foregoing specification as indicating the scope of the invention.

We claim:
1. Protective circuit apparatus for an electrical device supplied by electrical power through a three line electrical supply system including a high line, a neutral line and a housing ground line, comprising:
an overload trip-out circuit adapted to be connected between said electrical device and said three line electrical supply system for sensing current in excess of a selectable pre-determined value including means for disconnecting power to said electrical device when said sensed current exceeds said selected pre-determined value;

a ground fault detection and interrupter circuit connected in series with said overload trip-out circuit between said electrical device and said three line electrical supply system, said ground fault detection and interrupter circuit means including means for sensing current flow in excess of a pre-determined value through a housing ground line, said sensing means further including a resistance connected in series in the ground housing line, said ground fault detection and interrupter circuit further including means responsive to said sensing means for disconnecting power to said electrical device, said means responsive to said sensing means including a discharge device triggerable in response to the output of said sensing means, said discharge being connected to energize a switch means when triggered, said switch means disconnecting power to said electrical device; and a two to three wire converter circuit adapted to be connected between said three line electrical supply and said electrical device in series with said overload trip-out circuit and said ground fault detection and interrupter circuit, said two to three wire converter circuit being adapted to be connected to an electrical supply having at least a high and a neutral connection, said two to three wire converter circuit having its output connected in series with the ground fault detection and interrupter circuit and the overload trip-out circuit, said two to three wire converter circuit enabling power flow only if the lines are properly connected with the neutral and high lines of the supply.

2. Protective circuit apparatus in accordance with claim 1 wherein said switching means energizable by said discharge device is comprised of a relay.

3. A protective circuit apparatus for an electrical device supplied by electrical power through an electrical power line having at least a high line and a neutral line, comprising:

an overload trip-out circuit adapted to be connected between said electrical device and said power line, said overload trip-out circuit including means for sensing the current through at least one of the power line connections to the electrical device, said current sensing means including a resistance connected in at least one of the power lines, said overload trip-out circuit further including means for switchably disconnecting power from said electrical device in response to a signal from said current sensing means and means for adjustably selecting the value of sensed current which will cause said switch means to disconnect power from said electrical device;

a ground fault detection and interrupter circuit connected in series with said overload trip-out circuit for sensing current flow through a ground line connected to said ground terminal of said electrical device and said ground fault detection circuit including means for disconnecting power to said electrical device in response thereto; and a two to three wire converter circuit adapted to be connected to an electrical supply having at least a high and a neutral connection, said two to three wire converter circuit having its output connected in series with the ground fault detection and interrupter circuit and the overload trip-out circuit and enabling power flow only if the lines are properly connected with the neutral and high lines of the power line supply.

4. A protective circuit apparatus in accordance with claim 3 wherein said means for adjustably selecting the value of sensed current which will cause said switch means to disconnect power from said electrical device includes a potentiometer.

5. A protective circuit apparatus in accordance with claim 3 wherein said means for switchably disconnecting power from said electrical device in response to a signal from said current sensing means includes a relay having its relay coil connected in series with a thyristor.

6. A protective system for use with electrical devices provided with a normally high terminal, a normally neutral terminal and a ground terminal, comprising:

an overload trip-out circuit adapted to be connected to said electrical device for sensing current in excess of a selectable predetermined value including means for disconnecting power to said electrical device when said sensed current exceeds said selected predetermined value;

a ground fault detection and interrupter circuit connected in series with said overload trip-out circuit for sensing current flow through a ground line connected to said ground terminal of said electrical device and said ground fault detection circuit including means for disconnecting power to said electrical device in response thereto; and a two to three wire converter circuit adapted to be connected to an electrical supply having at least a high and a neutral connection, said two to three wire converter circuit its output connected in series with the ground fault detection and interrupter circuit and the overload trip-out circuit and enabling power flow only if the lines are properly connected with the neutral and high lines of the supply.

* * * * *